United States Patent
Ohba

(10) Patent No.: US 7,174,036 B2
(45) Date of Patent: Feb. 6, 2007

(54) FINGERPRINT IDENTIFICATION METHOD AND SYSTEM, AND BIOMETRICS IDENTIFICATION SYSTEM

(75) Inventor: Akitomo Ohba, Tokyo (JP)

(73) Assignee: NEC Corporation, Tokyo (JP)

( * ) Notice: Subject to any disclaimer, the term of this patent is extended or adjusted under 35 U.S.C. 154(b) by 715 days.

(21) Appl. No.: 10/303,843

(22) Filed: Nov. 26, 2002

(65) Prior Publication Data

US 2003/0099381 A1    May 29, 2003

(30) Foreign Application Priority Data

Nov. 26, 2001   (JP)   ............... 2001-359931

(51) Int. Cl.
  *G06K 9/00*   (2006.01)
(52) U.S. Cl. ...................................... 382/124
(58) Field of Classification Search ............... 382/124, 382/125
  See application file for complete search history.

(56) References Cited

U.S. PATENT DOCUMENTS

| 6,229,906 B1 * | 5/2001 | Pu et al. ..................... 382/116 |
| 6,259,805 B1 * | 7/2001 | Freedman et al. ............ 382/124 |
| 6,463,165 B1 * | 10/2002 | Ito ............................. 382/124 |
| 6,795,569 B1 * | 9/2004 | Setlak ......................... 382/124 |
| 6,826,533 B2 * | 11/2004 | Burchard et al. ............ 704/270 |

FOREIGN PATENT DOCUMENTS

| JP | 4-98370 | 3/1992 |
| JP | A 6-176135 | 6/1994 |
| JP | 10-154231 | 6/1998 |
| JP | 2000-011179 | 1/2000 |

* cited by examiner

*Primary Examiner*—Joseph Mancuso
*Assistant Examiner*—Damon Conover
(74) *Attorney, Agent, or Firm*—Young & Thompson

(57) ABSTRACT

A highly accurate identification system is built by using an identification module, which has predetermined values of FAR and FRR. A plurality of (m) biometrics are registered and managed. At the time of identification, a collation process is executed by using the m biometrics, and also a collation process is executed a plurality of (n) times with each biometrics. An identification result of the system is judged and outputted by combining the results of the m-biometrics collation and n-time collation trials. As conditions of judgment, when the collation is judged to be successful even once in the n-time collation trial, the collation is judged to be successful with respect to that biometrics. In the in-biometrics collation trial, when the collation is judged to be successful with respect to all the m biometrics, a judgment of identification success is given in the system as a whole.

6 Claims, 4 Drawing Sheets

FINGERPRINT IDENTIFICATION METHOD AND SYSTEM, AND BIOMETRICS IDENTIFICATION SYSTEM

BACKGROUND OF THE INVENTION

This application claims benefit of Japanese Patent Application No. 2001-359931 filed on Nov. 26, 2001, the contents of which are incorporated by the reference.

The present invention relates to biometrics identification systems for individual identification and, more particularly, to fingerprint identification method and system.

With recent rapid spread of portable telephone systems, it has been estimated to utilize portable telephone systems for purchasing products and making settlement there for in electronic business transactions. An individual identification system of high identification accuracy for making settlement in portable telephone system, thus has been demanded.

As for the prior art individual identification system, there are various technical methods, such as a technique of individual identification by using a physical property such as a key or a card, a technique of individual identification by using person's intelligence such as passwords, biometrics identification for individual identification by using feature data of body and techniques which are combinations of such techniques. However, the technique of individual identification by using a physical property has a drawback in that the physical property may be lost or stolen. In the identification technique using such intelligence as passwords, however, although the operation is easy and ready, the intelligence may be forgotten or stolen. Particularly, for realizing high identification accuracy, the number of key digits has to be increased, thus extremely deteriorating the convenience of handling.

In the biometrics identification technique utilizing feature data (biometrics) peculiar to the body such as fingerprints, voiceprints, faces and irises, on the other hand, the body data is neither lost, stolen nor forgotten.

Among the above identification systems, the fingerprint identification technique is thought to be promising from the standpoints of the size, cost and identification accuracy.

In the fingerprint identification technique, the identification is made by detecting patterns or features of raised parts (or raised lines) of fingerprints. The fingerprint identification system comprises a fingerprint identification module, which includes a fingerprint sensor part for reading out and detecting fingerprints as fingerprint patterns, a fingerprint registering part for preliminarily registering fingerprint patterns as identification templates in a memory, and a fingerprint identifying part for comparing and collating, at the time of identification, a fingerprint pattern (i.e., sample) detected in the fingerprint sensor part with the registered fingerprint pattern or patterns. The fingerprint sensor comprises a group of minute sensor pixel cells arranged at a pitch of, for instance, 50 to 100 μm, and it detects raised and recessed parts of a fingerprint. Various fingerprint pattern detecting systems are available for use in the fingerprint sensor. Among these systems are mainly an electrostatic capacitance system and an optical system. In the electrostatic capacitance system, for instance, as shown in FIG. 5, a Si (silicon) semiconductor element is used as substrate. Raised and recessed parts 14 and 15 of the fingerprint are detected with detection as fingerprint pattern, by individual cells 11, of capacitance 12 defined by the distance and the area of contact between the surface of a finger 13 and the substrate.

As the measure of the identification accuracy which is an important measure in the identifying technique, there are FAR (Fault Acceptance Ratio) and FRR (Fault Rejection Ratio). The FAR represents the probability of erroneously accepting a fault person as registered person (that is, per cent ratio of fault acceptance cases to fault persons, who are tested for identification). The FRR represents the probability of erroneously identifying a registered person as non-registered person and making a rejection (that is, per cent ratio of erroneous rejection cases to registered persons, who are tested for identification). The smaller are these values, the identification system can be said to have the higher identification accuracy.

As the identification accuracy in the present fingerprint identification techniques, FAR=0.0002% or below and FRR=0.05% or below are realized in fingerprint identification systems mounted in PC, work station, etc.

In the prior art fingerprint identification system, the fingerprint of the identified person is collated for identification with respect to only one finger. In this system, the FAR and FRR are provided, and their values in the fingerprint identification module correspond to the identification accuracy of the system.

As prior art, Japanese Patent Laid-Open No. 4-098370 discloses a system for fingerprint identification by using a plurality of fingers. In this system, the plurality of fingers are simultaneously inputted to the sensor for collation and identification. Japanese Patent Laid-Open No.10-154231discloses an identification system for making identification by taking the order of a plurality of times of fingerprint inputting into considerations. In both the above prior art techniques, a plurality of fingers are used for identification. However, by so doing sufficient identification accuracy may not always be obtained. In addition, in both the above techniques it is possible to improve the FAR, but doing so leads to deterioration (or increase) of the FRR.

In the case of making a high price product settlement in an electronic business transaction or the like, the identification system should have a high identification accuracy. As described before in connection with the prior art, in the fingerprint identification technique a high identification accuracy is realized. To realize high identification accuracy, however, high performance processor and high capacity memory are necessary, leading to high system price. At present, limitations are imposed on the processor performance and memory capacity that can be provided in the portable telephone set. Therefore, it is difficult to mount a fingerprint identification module having high identification accuracy as noted above.

SUMMARY OF THE INVENTION

The present invention was made in view of the above problems, and it has an object of providing a fingerprint identification system capable of higher identification accuracy with a fingerprint identification module, which has a predetermined identification accuracy and is inexpensive in cost.

According to an aspect of the present invention, there is provided a fingerprint identification method of making fingerprint identification based on fingerprint collation with predetermined values of FAR and FRR, comprising steps of: a registering step of registering and managing fingerprint patterns of a plurality of (i.e., m) fingers of users; an m-finger collation step of executing, at the time of identification, collation process with respect to the plurality of the registered finger; an n-time collation step of executing collation process a plurality of (i.e., n) times with respect to the plurality of fingers; and an identifying step of judging and outputting the identification result in the system as a whole by combining the results of the m-finger collation and n-time collation processes.

In the n-time collation step, when the collation is judged to be successful even once in the n-time collation trial, the collation is judged to be successful with respect to that finger; and in the m-finger collation step, when the collation is judged to be successful with respect to all the m fingers, a judgment of identification success (acceptance) is given in the system as a whole. The values of the FAR and FRR in the system as a whole are preset variably with the presetting of FAR, FRR, m and n to desired values. In the registering step, user's fingerprint patterns are registered in number greater than m; and the collation identification process is executed at the time of identification by using certain m fingers among the fingers greater in number than m that are registered in the registering step.

According to another aspect of the present invention, there is provided a fingerprint identification system comprising a fingerprint identification module including: a fingerprint registering means for registering and managing fingerprint patterns; a fingerprint sensor means for reading out fingerprints and detecting fingerprint patterns; and a fingerprint collation means for executing a collation process on the basis of a predetermined algorithm by comparing the fingerprint patterns detected by the fingerprint sensor means with the fingerprint patterns registered in the fingerprint registering means; the fingerprint identification module having predetermined values of FAR and FRR; wherein: the fingerprint registering means registers and manages user's fingerprint patterns of a plurality of (i.e., m) fingers; and at the time of identification, the fingerprint sensor means and the fingerprint collation means are rendered operative to input, for the collation process, fingerprint patterns of the plurality of (i.e., m) fingers and also of each finger a plurality of (i.e., n) times, and the results of the collation processes are combined to judge and output the identification result in the system as a whole.

In the collation process: when the collation is judged to be successful even once in the n-time collation trial with respect to a certain finger, a judgment of collation success is given with respect to that finger; and when the collation of the fingerprints of all the fingers is judged to be successful in the m-finger collation trial, a judgment of collation success (i.e., acceptance) is provided in the system as a whole. The values of the FAR and FRR in the system as a whole are preset variably with the presetting of the FAR, FRR, m and n to desired values. The fingerprint registering means registers and manages fingerprint patterns of user's fingers greater in number than m; and at the time of identification, the collation identification process is executed by using certain m fingers among the registered fingers greater in number than m.

According to other aspect of the present invention, there is provided a biometrics identification system comprising an identification module including: a registering means for registering and managing biometrics; a sensor means for reading out and detecting biometrics; and a collation means for executing a collation process on the basis of a predetermined algorithm by comparing biometrics detected by the sensor means with the biometrics registered in the registering means; the identification module having predetermined values of the FAR and FRR; wherein: the registering means registers and manages a plurality of (i.e., m) patterns of user's biometrics; and at the time of identification, the sensor means and the collation means are rendered operative to input, for the collation process, a plurality of (i.e., n) times with respect to the plurality of (i.e., m) biometrics and also to each biometrics, and the identification result in the system as a whole is judged and outputted by combining the results of the collation processes.

In the collation process: when the collation is judged to be successful even once in the n-time collation trial with respect to a certain biometrics, a judgment of collation success is given with respect to that biometrics; and when the collation of all the biometrics is judged to be successful in the m-biometrics collation trial, a judgment of identification success (i.e., acceptance) is given in the system as a whole. The values of the FAR and FRR are preset variably with the presetting of the FAR, FRR, m and n to desired values. The registering means registers and manages user's biometrics greater in number than m; and at the time of identification, the collation identification process is executed by using certain m biometrics among the registered biometrics greater in number than m.

Other objects and features will be clarified from the following description with reference to attached drawings.

PREFERRED EMBODIMENTS OF THE INVENTION

Preferred embodiments of the present invention will now be described with reference to the drawings.

Figure 2:
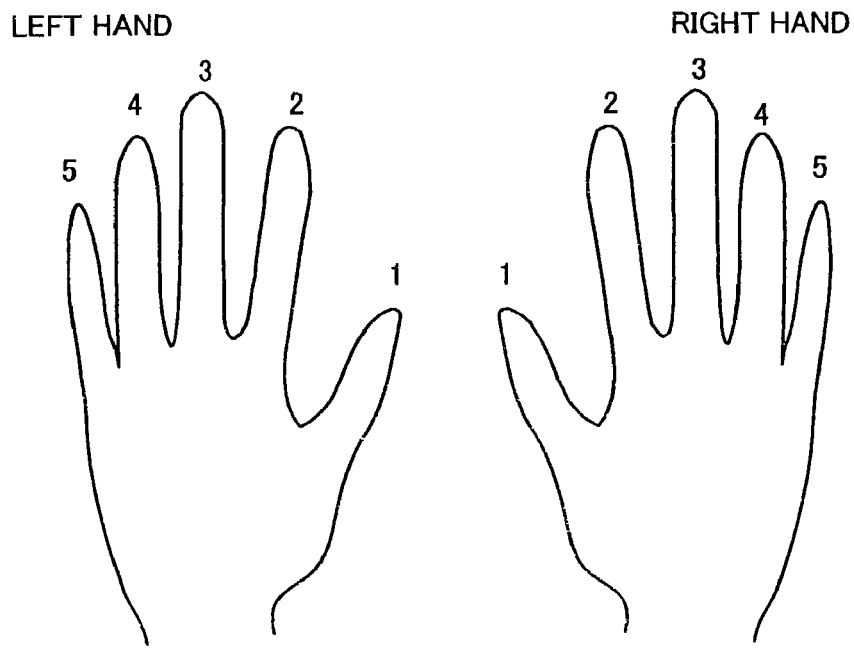
FIG. 2 is a view showing fingerprint identification with m fingers of a person.

In the fingerprint identification system according to the present invention, at the time of the identification by the fingerprint identification module, a plurality of (i.e., m) different fingers of a person to be identified are used for fingerprint identification (see FIG. 2). For this reason, at the time of the fingerprint registration, fingerprint patterns of a plurality of (i.e., m or more) fingers are registered. In this system, at the time of the identification m fingers are collated. When collation of all the m fingers is successful, the identified person is certified (i.e., accepted) as being successful in identification, that is, the identification is judged to be successful in the whole system. Furthermore, in repetitive collation of each finger, a plurality of (i.e., n) times is allowed. When collation success is obtained with a finger even once, the collation about this finger is judged to be successful. Such collation is made with all the above m different specified fingers, and when the collation is judged to be successful with all the fingers, the identified person is certified to be successful in identification, that is, the identification is judged to be successful in the system. In this way, the FAR and FRR as the identification accuracy measures of the whole system are improved.

Figure 1:
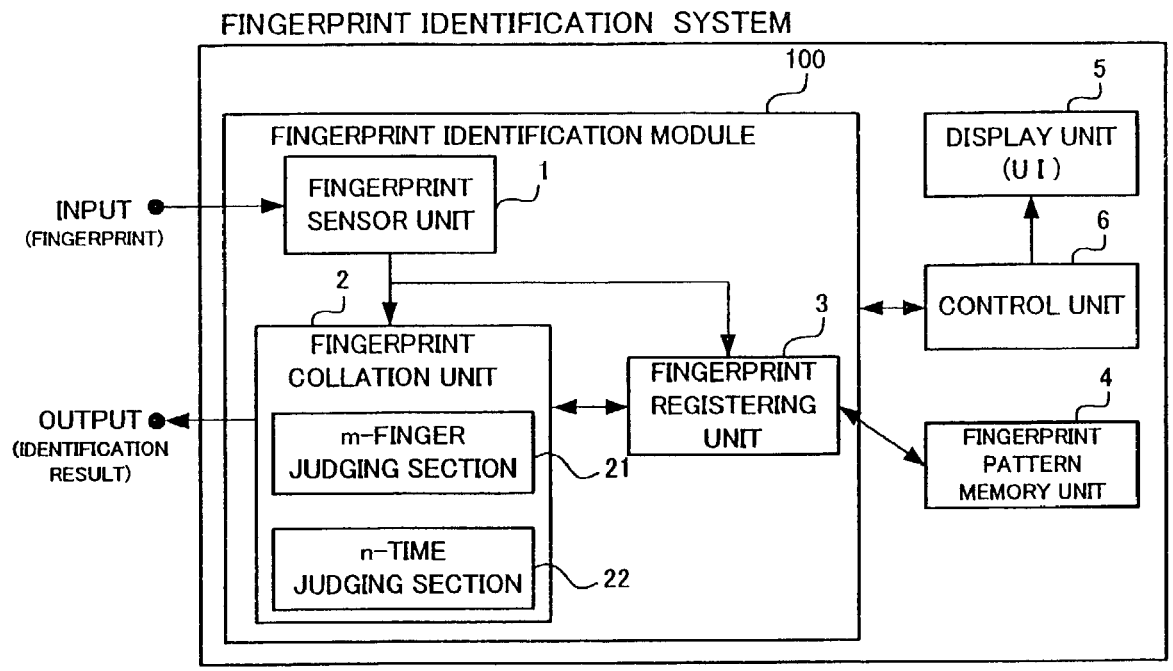
FIG. 1 is a view showing the construction of the embodiment of the fingerprint identification system according to the present invention.

FIG. 1 is a view showing the construction of the embodiment of the fingerprint identification system according to the present invention. The system comprises a fingerprint identification module 100 including a fingerprint sensor unit 1, a fingerprint collation unit 2 and a fingerprint registering unit 3, a fingerprint pattern memory unit 4, a display unit 5 and a control unit 6. The fingerprint identification module 100 has predetermined values of FAR and FRR as identification accuracy measures as determined by a collation algorithm or the like.

The fingerprint registering unit 3 executes a process of preserving and managing, in the fingerprint pattern memory unit 4, fingerprint patterns (or templates) of m fingers of the user as comparison subject at the time of identification. The fingerprint pattern memory unit 4 is constituted by a predetermined memory device such as a semiconductor memory.

An alternate system may be constructed such as to register fingerprint patterns of fingers greater in number than m (for instance 10). In this case, at the time of identification m fingers among the registered fingers are used for the identification. In this case, at the time of each identification a peculiar finger may be used for the identification.

The fingerprint sensor unit 1, as described before in connection with the prior art, is constituted by, for instance, an electrostatic capacitance sensor. The fingerprint sensor unit 1 takes out or reads out a fingerprint pattern (i.e., sample) from the inputted fingerprint, and it provides an output to the fingerprint registering unit 3 in the case of the registering and to the fingerprint collation unit 2 in the case of the identification. The fingerprint pattern is used as such in the subsequent process, or it is subjected to a feature quantity extracting process to be used as feature quantity data.

The fingerprint collation unit 2 compares and collates a fingerprint pattern (i.e., sample) detected in the fingerprint sensor unit 1 with the fingerprint pattern or patterns registered in the fingerprint registering unit 3 according to a predetermined collation algorithm. By the term "collation" is meant one time of collation process with respect to a certain finger. In the collation, "success"/"failure" is determined and outputted on the basis of similarity calculation. The fingerprint collation unit 2 includes an m-finger judging section 21 and an n-time judging section 22. The judgments in both the sections are combined, and the total identification result in this system are judged and outputted in the form of "acceptance"/"rejection". The identification result is outputted to a predetermined module. In this module, a predetermined process based on the identification result is executed.

The display part 5 has or also serves as an user interface, and it provides necessary instruction with respect to the identification procedure and also to such process as displaying the result of identification. In this system, the identification procedure is instructed to the user with respect to the m-finger n-time collation trial identification. The control unit 6 is such a controller as CPU or a predetermined program for controlling the entirety of the above identification procedure.

In the m-finger judging unit 21, collation process is executed with respect tom fingers. In the n-time judging unit 22, collation process is executed with respect to each finger up to n times. In this system, a plurality of m different fingers of one user are used for identification. When the collation is successful with respect to all the m different fingers, a judgment of identification success, i.e., acceptance, is made in the whole system. With respect to one finger, the collation trial is made up to n times. When the collation is judged to be successful within n times, the collation with respect to that finger is judged to be successful. The way of calculation of the FAR and FRR as identification accuracy measures of this system is determined according to the above condition presetting for the identification judgment in the whole system.

The FAR and FRR as identification accuracy measures corresponding to the identification concept underlying this system are referred to as FAR(m, n) and FRR(m, n), respectively. Also, FAR and FRR corresponding to the concept of identification using m fingers are referred to as FAR(m) and FRR(m), respectively, and FAR and FRR corresponding to the concept of identification, in which collation with respect to one finger is executed up to n times, are referred to as FAR(n) an FRR(n), respectively. More specifically, these identification accuracy measures represent the following. The FAR(m) represents the ratio of cases, in which acceptance is obtained with all m fingers, to registered m-finger collation trials.

Likewise, the FRR(m) represents the ratio of cases, in which rejection is made with respect to even one of m fingers, to registered m-finger collation trials. The FAR(n) represents the ratio of cases, in which collation becomes successful within n times, to registered one-finger, up-to-n-times collation trials. The FRR(n) represents the ratio of collation failure cases to registered one-finger up-to-n-times collation trials.

Now, the FAR and FRR of the fingerprint identification module 100 are referred to as FARx and FRRx, respectively, and it is assumed that the identification accuracy of the fingerprint identification module 100 is relatively low, for instance with FARx of 1%, i.e., 0.01. A case is now considered, in which fingerprint patterns of two or more different fingers such as the thumb and the index finger are registered in the fingerprint identification module 100, and at the time of identification the two fingers are used for the identification. As the judging conditions for the identification in the whole system, it is made to be the acceptance condition that the collation of both the two fingers with the registered fingerprint patterns are judged to be successful, while the other case is made to be the rejection case. Under these conditions, the FAR and FRR, i.e., FAR(m=2) and FRR(m=2), are obtained as follows.

Since the acceptance condition is that the collation is successful with both the fingers, FAR(m=2) (i.e., fault acceptance ratio in two-finger identification) is the probability of fault acceptance with respect to both the two fingers. Since FAR with respect to each finger is FARx, the value of FAR(m=2) is FARx×FARx, that is, $$FAR(m{=}2){=}FARx \times FARx{=}FARx^2{=}0.01^2{=}0.0001{=}0.01\% \qquad (1)$$

As for FRR(m=2), i.e., "fault rejection ratio in two-finger identification", since the FRR is the probability of rejecting registered persons, (1-FRR) is the probability of correctly accepting registered persons as such. The condition for acceptance is that the collation is successful with respect to both the two fingers, and the probability of collation success with respect to both the two fingers is $(1\text{-}FRR)^2$. The probability of fault rejection is the difference result of subtraction of the probability $(1\text{-}FRR)^2$ from 1. The FRR (m=2) thus has the following value.

$$FRR(m = 2) = 1 - (1 - FRRx)^2 \approx 1 - (1 - 2 \times FRRx) \qquad (2)$$
$$= 2 \times FRRx = 2 \times 0.01 = 0.02 = 2\% \ (FRRx \ll 1)$$

In the case of making identification by using a plurality of different fingers, the FAR, i.e., the fault acceptance ratio is reduced to obtain high identification accuracy. However, the FRR is increased and deteriorated compared to the one-finger case.

In the case of identification under judgment conditions that m different fingers are used and that the collation is accepted when collation is successful with respect to all the m fingers, the identification accuracy can be given from the above as $$FAR(m) = FARx^m \tag{3}$$

$$FRR(m) = 1-(1-FRRx)^m \tag{4}$$

In the present identification system, the FRR is further improved by collation with respect to each of m fingers a plurality of times (i.e., up to n times). As an example, a case will be considered, in which the collation is executed with each finger up to three times, and when the collation is successful even once in the three times, the collation with respect to this finger is judged to be successful. The FAR and FRR based on this concept are referred to as FAR(n=3) and FRR(n=3), respectively. The FAR(2, 3) and FRR(2, 3) in the identification system, in which collation is executed with two fingers up to three times, can be obtained as follows.

First, the FAR(n=3), the "fault acceptance ratio in three-time collation", is the probability of cases except for cases, in which the collation fails to be successful in all the three times, in fault one-finger three-time collation trials, and one-time collation failure probability is (1−FARx). The FAR(n=3) thus can be calculated as:

$$FAR(n=3) = 1-(1-FARx)^3 \tag{5}$$

The FAR(2, 3), which is obtained by repeating this calculation with respect to two fingers, is thus given from the equation (1) or (3) as:

$$\begin{aligned} FAR(2, 3) &= (1-(1-FARx)^3)^2 \cdot (1-(1-3FARx))^2 \\ &= 3^2 \times FARx^2 = 9 \times 0.01^2 = 0.0009 \\ &= 0.09\% \quad (FARx \ll 1) \end{aligned} \tag{6}$$

The FRR(n=3), i.e., "fault rejection ratio in three-time collation", is the probability of cases, in which the collation fails to be successful in all the three times, in fault one-finger three-time collation trials. Since the one-time collation failure probability is FRRx, the FRR(n=3) can be calculated as:

$$FRR(n=3) = FRRx^3 \tag{7}$$

The FRR(2, 3), which is obtained by repeating this calculation with respect to two fingers, is thus given from the above equation (2) or (4) as:

$$\begin{aligned} FRR(2, 3) &= 1-(1-FRRx^3)^2 \cdot 1-(1-2 \times FRRx^3) \\ &= 2 \times FRRx^3 = 2 \times 0.01^3 = 0.000002 \\ &= 0.0002\% \quad (FRRx \ll 1) \end{aligned} \tag{8}$$

In the case of executing identification under judgment conditions that collation is tried with each finger up to n times and that when the collation is successful even once, the collation with respect to that finger is judged to be successful, the identification accuracy is given from the above as:

$$FAR(n) = 1-(1-FARx)^n \tag{9}$$

$$FRR(n) = FRRx^n \tag{10}$$

From the above considerations, in the system of doing identification under conditions that m different fingers are used for identification, that collation trial is allowed with respect to each finger up to n times, that when collation is successful up to n times, the collation with respect to that finger is judged to be successful, and that when collation is judged to be successful with respect to all the m fingers, acceptance judgment is given in the system, the identification accuracy is given as:

$$\begin{aligned} FAR(m, n) &= ((1-(1-FARx)^n)^m \cdot (n \times FARx))^m \\ &= n^m \times FARx^m (FARx \ll 1) \end{aligned} \tag{11}$$

The above formulas are for calculation by using binomial series expansion formulas and approximations.

As is seen from the above formulas, in the present identification system, in which m fingers are used for collation with each finger in n times, the FAR and FRR are reduced as power to m and power to n, respectively. By presetting the values of m and n and also values of FARx and FRRx, it is possible to preset the values of the identification accuracy measures FAR(m, n) and FRR(m, n) in the present system. Thus, it is possible to increase the identification system design freedom and preset the identification accuracy variably independence on the system application.

Figure 3:
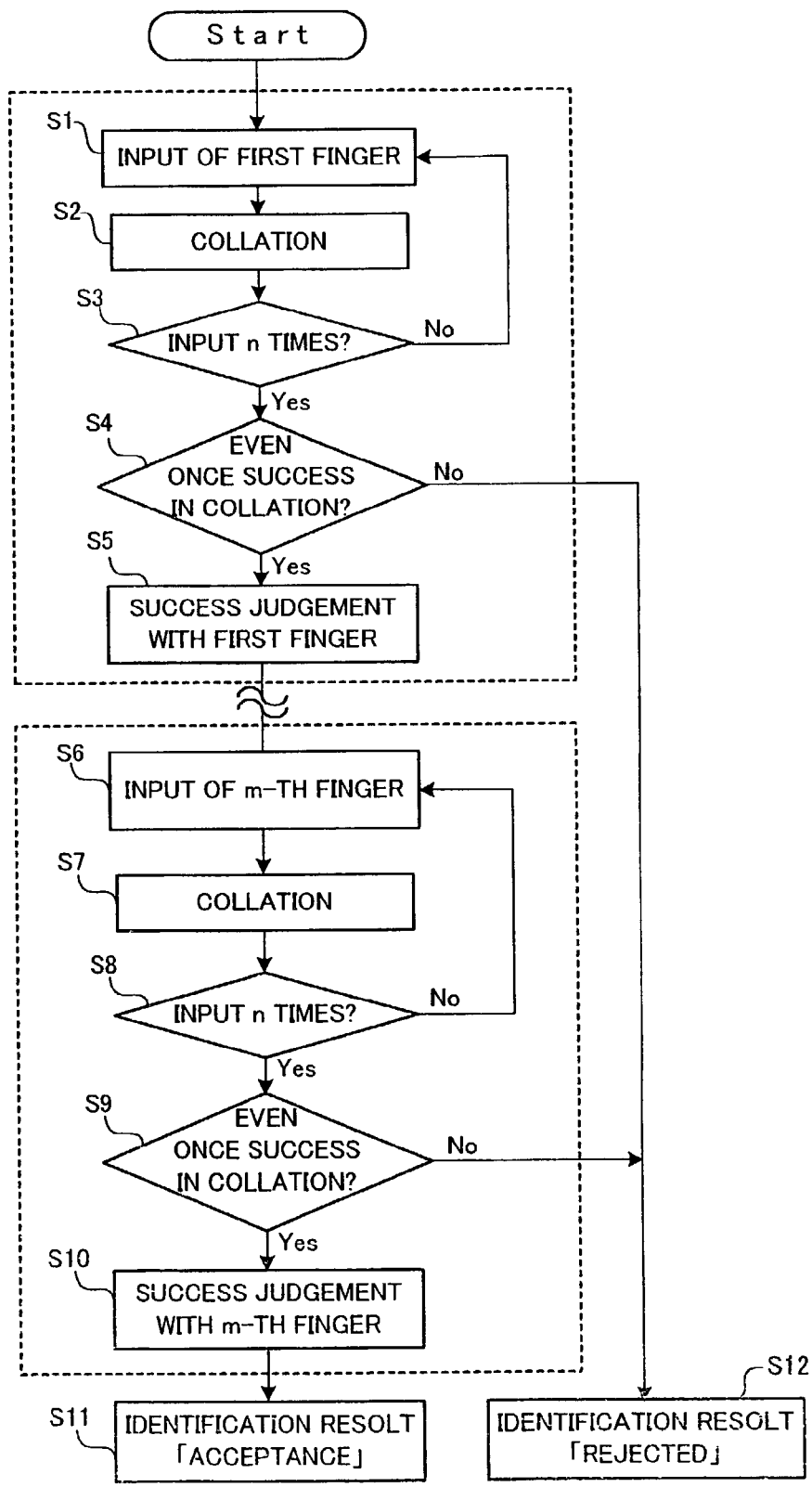
FIG. 3 is a flow chart illustrating the identification routine in the embodiment of the fingerprint identification system according to the present invention.

FIG. 3 is a flow chart illustrating the identification routine in the embodiment of the fingerprint identification system according to the present invention. First, according to an instruction from the user interface in the display unit 5, the user inputs a fingerprint pattern (or sample) for the first time by setting fingers from a first finger on the fingerprint sensor unit 1 (step S1). The detected fingerprint pattern is coupled to the fingerprint collation unit 2 for comparative collation (i.e., either 1:1 collation or 1:N collation, N being the number of registered users) with the registered fingerprint pattern (or patterns) in the fingerprint registering unit 3 (step S2).

Subsequently, a check is made as to whether the fingerprint pattern has been inputted and collated n times (step S3). This collation process is executed repeatedly n times. Meanwhile, a check is made as to whether the collation is successful even once among the n times (step S4). In the case when the collation has not been successful at all, the collation with respect to that finger is judged to be a failure. The system thus judges the identification result to be "rejected", and outputs the result (step S12). The result data in each collation process is outputted, if necessary, to the display unit 5.

When the collation is successful even once ("YES" in the step S4), the collation with respect to the first finger is judged to be successful (step S5), and the routine goes to a collation process with respect to a second finger. The collation processes with respect to the second and following fingers are executed in the same way as the collation with respect to the first finger, and finally a collation process with respect to the m-th finger is made (steps S6 to S10). When the collation with respect to the m-th finger is judged to be successful (step S10), this means that the collation is successful with respect to all them fingers, and the system provides "acceptance" judgment as the identification result, and outputs the result (step S11).

In the above identification routine, the n-time collation need not be tried n times, and it is possible to proceed to the collation with the next finger when collation success is obtained once.

Figure 4:
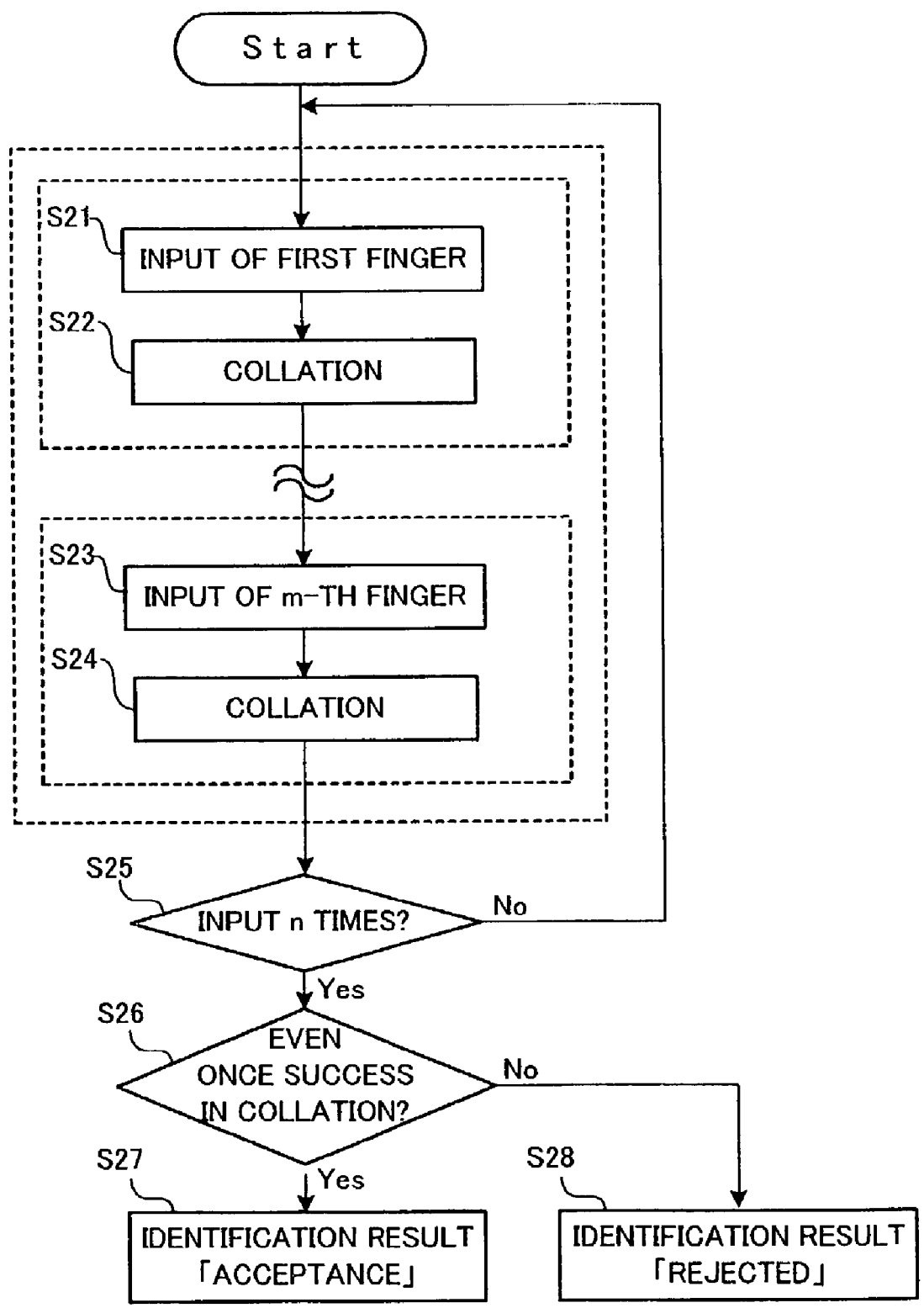
FIG. 4 is a flow chart illustrating an alternative of identification routine in the fingerprint identification system.
Figure 5:
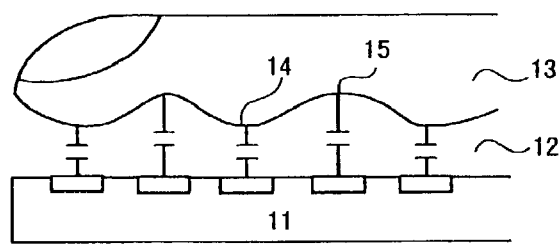
FIG. 5 shows a construction of the fingerprint sensor based on electrostatic capacitance system.

FIG. 4 shows an alternative of the above identification routine. In this case, collation is executed successively with them fingers for the first time, and this process is executed repeatedly n times. In other words, each collation process may be executed in any sequential order. Also, in the one-finger n-time collation trial by the user, the process may proceed to the collation of the next finger when the collation is once judged to be successful instead of always trying the collation n times.

Referring to FIG. 4, like that in FIG. 3, processes S21 to S24 are executed as the input of first finger (step S21), the collation (step S22), and the input of M-the finger (step S23), the collation (step S24). Then, a check is made as to whether the fingerprint pattern has been inputted and collated n times (step S25). This collation process is executed repeatedly n times. Meanwhile, a check is made as to whether the collation of each finger is successful even once among the n times (step S26). In the case when the collation has not been successful at all, the collation with respect to that finger is judged to be a failure. The system thus judges the identification result to be "rejected", and outputs the result (step S28). In the step S26, even when the collation with respect to each finger is judged to be successful once, the system provides "acceptance " judgment as the identification result (step S27).

Figure 6:
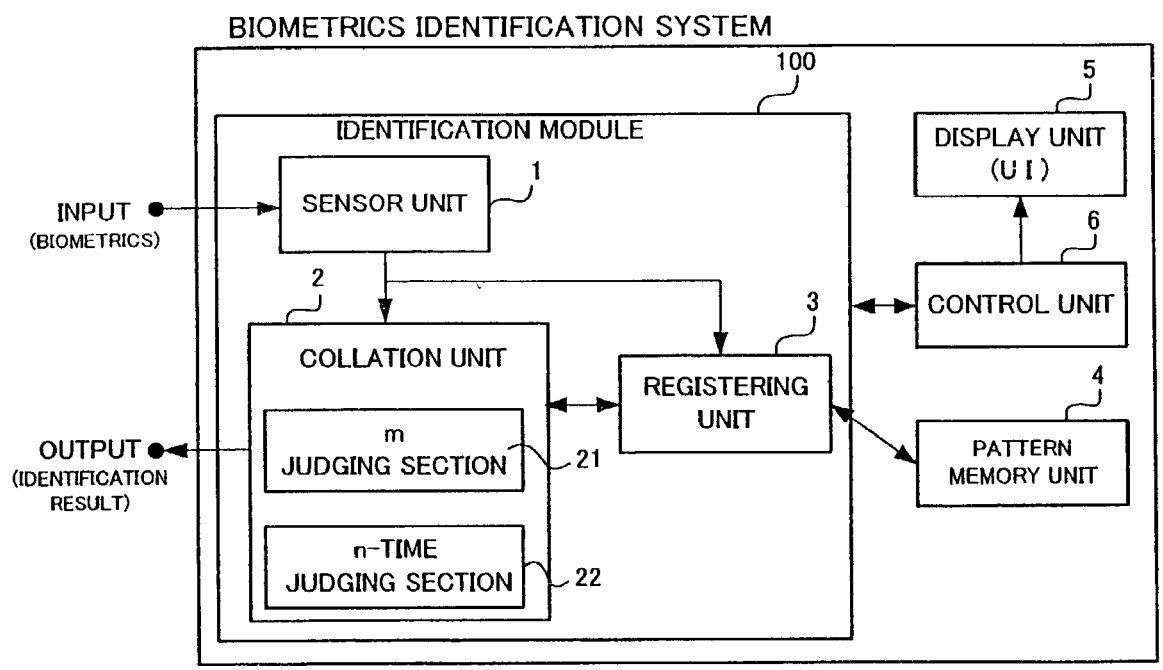
FIG. 6 is a view showing the construction of the embodiment of the biometrics identification system according to the present invention.

The present system is applicable not only to the fingerprint identification but also to biometrics identification systems, in which a plurality registered patterns are used for the identification. Examples of such identification may be those using such biometrics as voice fingerprints and irises. These examples are based on the same principle as the fingerprint identification. The structure of this biometrics identification system is shown in FIG. 6. Although the fingerprint should be replaced with the biometrics, the structure is similar to that in FIG. 1 and further description thereof is omitted.

As has been made obvious in the above description, according to the present invention the collation process is carried out repetitively a plurality of times with respect to a plurality of fingers and also to each finger by using an identification module, which has predetermined values of FAR and FRR as identification accuracy measures, thus permitting identification accuracy improvement in the system as a whole. Also, the FAR and FRR as the identification accuracy measures of the system can be preset variably, thus permitting improvement of the design freedom and application freedom.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A fingerprint identification method of making fingerprint identification based on fingerprint collation with individual fingerprint collation trial values of FARx and FRRx, the method comprising:

a registering step of registering fingerprint patterns of a plurality of (i.e., m) fingers of a person to be identified by the method;

an m-finger collation step of executing, at the time of identification, an individual fingerprint collation trial for each of the plurality of m fingers;

an n-time collation step of executing the individual fingerprint collation trial a plurality of (i.e., n) times for each of the plurality of m fingers; and an identifying step of judging and outputting the identification result by combining the results of the m-finger collation and n-time collation steps, wherein, in the n-time collation step, when the individual collation trial is judged to be successful even once in the n individual collation trials, the collation is judged to be successful with respect to that finger, and in the m-finger collation step, when the collation is judged to be successful with respect to all the m fingers, a judgment of identification success (acceptance) is given; and a defining step of defining values of FAR and FRR for the identification result by setting values of FARx, FRRx, m and n prior to executing the method, wherein the FAR for the identification result is defined as $FAR(m, n) = n^m \cdot FARx^m$ (FARx <<1).

2. A fingerprint identification method of making fingerprint identification based on fingerprint collation with individual fingerprint collation trial values of FARx and FRRx, the method comprising:

a registering step of registering fingerprint patterns of a plurality of (i.e., m) fingers of a person to be identified by the method;

an m-finger collation step of executing, at the time of identification, an individual fingerprint collation trial for each of the plurality of m fingers;

an n-time collation step of executing the individual fingerprint collation trial a plurality of (i.e., n) times for each of the plurality of m fingers; and an identifying step of judging and outputting the identification result by combining the results of the m-finger collation and n-time collation steps, wherein, in the n-time collation step, when the individual collation trial is judged to be successful even once in the n individual collation trials, the collation is judged to be successful with respect to that finger, and in the m-finger collation step, when the collation is judged to be successful with respect to all the m fingers, a judgment of identification success (acceptance) is given; and a defining step of defining values of FAR and FRR for the identification result by setting values of FARx, FRRx, m and n prior to executing the method, wherein the FRR for the identification result is defined as $FRR(m, n) = m \cdot FRRx^n$ (FRRx <<1).

3. A fingerprint identification system comprising:

a fingerprint identification module including a fingerprint registering means for registering and managing fingerprint patterns, a fingerprint sensor means for reading out fingerprints and detecting fingerprint patterns, and a fingerprint collation means for executing a collation process on the basis of a predetermined algorithm by comparing the fingerprint patterns detected by the fingerprint sensor means with the fingerprint patterns registered in the fingerprint registering means, the fingerprint identification module having individual fingerprint collation trial values of FARx and FRRx, wherein:

the fingerprint registering means registers and manages user's fingerprint patterns of a plurality of (i.e., m) fingers; and at the time of identification, the fingerprint sensor means and the fingerprint collation means are rendered operative to input, for the collation process, fingerprint patterns of the plurality of (i.e., m) fingers and also of each finger a plurality of (i.e., n) times, and the results of the collation processes are combined to judge and output the identification result, wherein when an individual collation trial is judged to be successful even once in the n individual collation trials for a respective finger, the collation is judged to be successful with respect to that finger, and when the collation is judged to be successful with respect to all the m fingers, a judgment of identification success (acceptance) is given, and wherein values of FAR and FRR for the identification result are defined in said fingerprint collation means by setting values of FARx, FRRx, m and n, wherein the FAR for the identification result is defined as $FAR(m, n) = n^m \cdot FARx^m$ (FARx << 1).

4. A fingerprint identification system comprising:

a fingerprint identification module including a fingerprint registering means for registering and managing fingerprint patterns, a fingerprint sensor means for reading out fingerprints and detecting fingerprint patterns, and a fingerprint collation means for executing a collation process on the basis of a predetermined algorithm by comparing the fingerprint patterns detected by the fingerprint sensor means with the fingerprint patterns registered in the fingerprint registering means, the fingerprint identification module having individual fingerprint collation trial values of FARx and FRRx, wherein:

the fingerprint registering means registers and manages user's fingerprint patterns of a plurality of (i.e., m) fingers; and at the time of identification, the fingerprint sensor means and the fingerprint collation means are rendered operative to input, for the collation process, fingerprint patterns of the plurality of (i.e., m) fingers and also of each finger a plurality of (i.e., n) times, and the results of the collation processes are combined to judge and output the identification result, wherein when an individual collation trial is judged to be successful even once in the n individual collation trials for a respective finger, the collation is judged to be successful with respect to that finger, and when the collation is judged to be successful with respect to all the m fingers, a judgment of identification success (acceptance) is given, and wherein values of FAR and FRR for the identification result are defined in said fingerprint collation means by setting values of FARx, FRRx, m and n, wherein the FRR for the identification result is defined as $FRR(m, n) = m \cdot FRRx^n$ (FRRx << 1).

5. A biometrics identification system comprising:

an identification module including a registering means for registering and managing biometrics, a sensor means for reading out and detecting biometrics, and a collation means for executing a collation process on the basis of a predetermined algorithm by comparing biometrics detected by the sensor means with the biometrics registered in the registering means, the identification module having individual biometric collation trial values of FARx and FRRx, wherein:

the registering means registers and manages a plurality of (i.e., m) patterns of user's biometrics; and at the time of identification, the sensor means and the collation means are rendered operative to input, for the collation process, a plurality of (i.e., n) times for each of the plurality of (i.e., m) biometrics, and the identification result is judged and outputted by combining the results of the collation processes, wherein when an individual collation trial is judged to be successful even once in the n individual collation trials for a respective biometric, the collation is judged to be successful with respect to that biometric, and when the collation is judged to be successful with respect to all the m biometrics, a judgment of identification success (acceptance) is given, and wherein values of FAR and FRR for the identification result are defined in said identification module by setting values of FARx, FRRx, m and n, wherein the FAR for the identification result is defined as $FAR(m, n) = n^m \cdot FARx^m$ (FARx << 1).

6. A biometrics identification system comprising:

an identification module including a registering means for registering and managing biometrics, a sensor means for reading out and detecting biometrics, and a collation means for executing a collation process on the basis of a predetermined algorithm by comparing biometrics detected by the sensor means with the biometrics registered in the registering means, the identification module having individual biometric collation trial values of FARx and FRRx, wherein:

the registering means registers and manages a plurality of (i.e., m) patterns of user's biometrics; and at the time of identification, the sensor means and the collation means are rendered operative to input, for the collation process, a plurality of (i.e., n) times for each of the plurality of (i.e., m) biometrics, and the identification result is judged and outputted by combining the results of the collation processes, wherein when an individual collation trial is judged to be successful even once in the n individual collation trials for a respective biometric, the collation is judged to be successful with respect to that biometric, and when the collation is judged to be successful with respect to all the m biometrics, a judgment of identification success (acceptance) is given, and wherein values of FAR and FRR for the identification result are defined in said identification module by setting values of FARx, FRRx, m and n, wherein the FRR for the identification result is defined as $FRR(m, n) = m \cdot FRRx^n$ (FRRx << 1).

* * * * *